United States Patent [19]

Malpass, Jr.

[11] Patent Number: 5,350,818
[45] Date of Patent: Sep. 27, 1994

[54] PROCESS FOR PREPARING A HIGH DENSITY POLYETHYLENE OF LOW N-PARAFFIN CONTENT AND HIGH MELT INDEX RATIO

[75] Inventor: Gerald D. Malpass, Jr., Kingwood, Tex.

[73] Assignee: Exxon Chemical Patents Inc., Linden, N.J.

[21] Appl. No.: 127,462

[22] Filed: Sep. 27, 1993

Related U.S. Application Data

[63] Continuation of Ser. No. 981,928, Nov. 24, 1992, abandoned, which is a continuation of Ser. No. 280,605, Dec. 6, 1988, abandoned.

[51] Int. Cl.$^5$ .................. C08F 4/636; C08F 4/68; C08F 10/02
[52] U.S. Cl. .................. 526/139; 526/97; 526/124; 526/129; 526/348.5; 526/352; 526/903; 526/904
[58] Field of Search .............. 526/129, 139, 161, 97, 526/124

[56] References Cited

U.S. PATENT DOCUMENTS

| | | | |
|---|---|---|---|
| 3,347,840 | 10/1967 | Manyik et al. | 526/903 |
| 3,925,334 | 12/1975 | McShane, Jr. | 260/80.78 |
| 3,929,745 | 12/1975 | Huerta et al. | 526/161 |
| 4,252,927 | 2/1981 | Eve | 526/105 |
| 4,252,928 | 2/1981 | Eve | 526/106 |
| 4,455,386 | 6/1984 | Lynch et al. | 526/139 |
| 4,514,514 | 4/1985 | Martin | 526/139 |
| 4,607,019 | 8/1986 | Best | 526/129 |
| 4,647,550 | 3/1987 | Kohora et al. | 526/129 |
| 4,663,403 | 5/1987 | McDaniel | 526/139 |
| 4,693,990 | 9/1987 | Hiroyuki et al. | 526/129 |
| 4,727,049 | 2/1988 | Furuhashi et al. | 526/129 |
| 4,886,771 | 12/1989 | Kao et al. | 502/121 |

FOREIGN PATENT DOCUMENTS 910132  11/1962  United Kingdom .

Primary Examiner—Edward J. Smith
Attorney, Agent, or Firm—T. D. Simmons; Douglas W. Miller

[57] ABSTRACT

A process for producing a high density polyethylene resin which has a negligible n-paraffin content while having a melt index ratio of at least 75 by polymerizing ethylene with a minor amount of a diene in the presence of a supported organophosphorous modified vanadium-containing catalyst component. Vanadium-containing catalyst components useful with an organoaluminum cocatalyst for polymerizing ethylene with an aliphatic diene to produce high density resins having not only a low $C_{10}$–$C_{32}$ n-paraffin content (characteristic of high molecular weight polymers having a narrow molecular weight distribution), but, surprisingly, also a melt index ratio desirable for melt blowing applications more characteristic of vanadium catalyzed polymers (which have relatively high n-paraffin content), are obtained by contacting an inert support material with an organoaluminum compound, an optional halogenating agent, a vanadium compound, and an organophosphorous compound. A diene containing at least four carbon atoms is used to copolymerize with ethylene.

16 Claims, No Drawings

PROCESS FOR PREPARING A HIGH DENSITY POLYETHYLENE OF LOW N-PARAFFIN CONTENT AND HIGH MELT INDEX RATIO

This is a continuation of application Ser. No. 07/981,928, filed Nov. 24, 1992, which is a continuation of application Ser. No. 07/280,605, filed Dec. 6, 1988 both now abandoned.

FIELD OF THE INVENTION

This invention relates to a novel process for using a vanadium-based catalyst to produce a high density polyethylene resin which has a low oligomer (i.e. $C_{10}$–$C_{32}$) content while having a melt index ratio (MIR) of at least 75. The ease of processability of such polyethylene resin as a blow molding resin is maintained by reason of its higher shear sensitivity, as evidenced by its high MIR value, while the resin's quantity of low molecular weight n-paraffins, which is responsible for the release of objectionable quantities of smoke during blow molding operations, is reduced or eliminated. A polyethylene resin produced by the process of the invention is therefore particularly well suited for use as a blow molding resin for the production of household or industrial containers.

BACKGROUND

It is known that catalysts of the type generally described as Ziegler catalysts are useful for the polymerization of olefins under moderate conditions of temperature and pressure. It is also well known that the properties of polymer resin product obtained by polymerizing olefins in the presence of Ziegler-type catalysts vary greatly as a function of the monomers of choice, catalyst components, catalyst modifiers and a variety of other conditions which affect the catalytic polymerization process.

Important among properties of polymer resins is average molecular weight and molecular weight distribution. High molecular weights generally signify polymers having high strength properties. The melt index value ("MI") of a polymer is a measure of its average molecular weight. However two different polyethylene resins can have the same MI value and be significantly different in the distribution of the number of molecules of various molecular weights that make up the average molecular weight. Even with the same MI value, one resin might have very different quantities of high molecular weight and low molecular weight fractions and thus exhibit very different processing characteristics and properties. Thus, the molecular weight distribution ("MWD") provides important additional information about the processability and mechanical properties of a polymer. One measure of the breadth of the MWD is Melt Index Ratio ("MIR"). The MIR is defined herein as the quotient obtained by dividing the MI value of the polymer into its high load melt index ("HLMI") value. The MI and HLMI values are given by ASTM D 1238, which measures the rate of extrusion of a resin through an orifice of specific length and diameter under prescribed conditions of temperature and pressure. (A high molecular weight material is more resistant to flow than a low molecular weight material, therefore the index is inverse; a high value signifies a greater rate of extrusion, hence a lower average molecular weight.) Condition E of ASTM D 1238 uses a temperature of 190° C. and a total load of 2,160 grams (about 43.25 psi). Condition F uses the same temperature but ten times the load of condition E; its results are the HLMI value. HLMI/MI, or MIR, indicates shear response, where larger values usually indicate broader molecular weight distributions for typical high density polyethylenes.

Among Ziegler-type catalysts, supported vanadium catalysts are known for a tendency to produce high density polyethylene resins having a broad MWD. By reason of the resin's broad MWD a significant portion of the resin material may exist as polyethylene polymer chains which have a low degree of polymerization, i.e. a degree of polymerization on the order of about 5 to about 16 monomer units and correspondingly a low molecular weight of about 142 to about 450. As an example, European patent publication 099 660 teaches that unless certain precautions are taken, such ethylene oligomers are formed. The presence in the polyethylene resin of a significant proportion of low molecular weight oils or n-paraffins in the $C_{10}$–$C_{32}$ range poses certain disadvantages to the use of such resin for blow molding applications. The n-paraffins have relatively low boiling points, and at elevated temperatures during processing of the polyethylene resin to form useful articles, such as blow molding of household or industrial containers, in which the resin is heated to about 400° F. the n-paraffins in the resin vaporize, and, upon exposure to ambient air, condense into airborne droplets, making smoke. The smoke is considered objectionable by processors and impairs acceptability of vanadium-based broad MWD polyethylene resin product. Such low molecular weight oils can have other adverse effects. For example, since such materials have a waxy nature, they can exude into mold vent holes causing plugging of the hole and thus poor operation.

One means of reducing n-paraffins and smoke in vanadium-based polyethylene resins is to narrow the MWD of the resin, thereby reducing the level of low molecular weight n-paraffinic material. This may be accomplished using the catalyst of the invention described in U.S. Pat. No. 5,262,372. However, the seemingly simple expedient of narrowing the MWD also correspondingly decreases the processability and melt strength of the resin, factors signified by lower melt index ratios. Thus, approaching elimination or reduction of the smoke generation problem by narrowing the MWD of the resin generally gives tradeoffs between acceptability of the polyethylene as a blow molding resin and the level of smoke in a vanadium based polyethylene product.

SUMMARY OF THE INVENTION

In accordance with the process of this invention an organophosphorous modified vanadium based catalyst is employed to copolymerize minor amounts of a diene with ethylene to produce a high density (0.94 or higher) polyethylene resin having a low n-paraffin ($C_{10}$–$C_{32}$) content while having a melt index ratio (MIR) of at least 75. As described in my co-pending application identified above, organophosphorous catalyst modifiers for vanadium-based catalyst combinations have been found which provide good comonomer incorporation and excellent hydrogen responsiveness for the control of molecular weight and also give even better catalytic activity in some cases. In accordance with this invention such catalysts are used to copolymerize minor amounts of a diene with ethylene to provide a high density polymer resin having both a reduced content of n-paraffin and, surprisingly, at the same time, excellent processability and melt strength. The product polymers produced by the process with such organophosphorous-modified vanadium catalyst systems are especially suitable as smokeless resins for high temperature processing applications, such as blow molding.

Accordingly, the process of this invention comprises polymerizing ethylene with a minor amount of a diene having at least 4 carbon atoms in the presence of a vanadium-containing catalyst component obtained by treating an inert solid particulate support material in an inert solvent with a vanadium compound and an organophosphorous compound to produce a high density polyethylene having less than 0.2 weight percent n-paraffin ($C_{10}$–$C_{32}$) content and an MIR of at least 75. The catalyst used to practice the process of the invention is one prepared by treating an inert support material in an inert solvent with (1) any of the vanadium compounds of the type traditionally used to prepare vanadium-based polyolefin catalysts, and with (2) an organophosphorous compound selected from the group consisting of phosphines, such as a trihydrocarbyl phosphine or a tri(N N'dihydrocarbylamino) phosphine; phosphite esters, such as a trihydrocarboxy phosphine; and phosphine oxides, such as a trihydrocarboxy phosphine oxide, a hydrocarbyl dihydrocarboxy phosphine oxide, a trihydrocarbyl phosphine oxide, or a tri(N N'dihydrocarbylamino) phosphine oxide, or a mixture of two or more of such phosphines, phosphite esters and phosphine oxides. Preferably the hydrocarbyl radical and/or the hydrocarbyl portion of the hydrocarboxy radical of the organophosphorous compound is a $C_1$ to $C_{10}$ aliphatic or aromatic hydrocarbon radical free of aliphatic unsaturation. The diene monomer used for copolymerization with ethylene contains at least 4 carbon atoms. Accordingly, the phosphorous modified vanadium-based catalyst used in the process may be prepared to have as a constituent element a diene component.

In accordance with one process embodiment of this invention a vanadium-containing catalyst component is used which is obtained by treating an inert solid support material in an inert solvent with: a vanadium compound (A), an organoaluminum compound (B) represented by the formula $R_mAlX_{3-m}$ wherein R represents a hydrocarbyl radical, X represents a halogen atom and "m" represents a number greater than zero and less than or equal to 3, optionally a halogenating agent (C), and an organophosphorous compound (D). The catalyst so produced is utilized to polymerize ethylene with a minor amount of a diene to produce a high density polyethylene resin.

The order of treatment of the solid support material with compounds (A), (B), (C), or (D) may vary. The support material may be treated with the vanadium compound (A) before the organoaluminum compound (B), or the support material may be treated with the organoaluminum compound (B) before the vanadium compound (A). Treatment with the organophosphorous compound (D) follows treatment with compounds (A) and (C) when (C) is used. The preferred order is (A), (B), optionally (C), then (D).

Another process embodiment of the invention utilizes a vanadium containing solid prepolymerized catalyst component, comprising a prepolymerized solid reaction product obtained by treating an inert solid support material in an inert solvent with a vanadium compound (A), organoaluminum compound (B) of the formula stated above optionally a halogenating agent (C), and an organophosphorous compound (D), then prepolymerizing the solid with a small amount of ethylene, in the presence of from about 0.1 to about 100 moles per gram of vanadium, of a diene (E) containing at least 4 carbon atoms. The solid prepolymerized catalyst is utilized to polymerize ethylene or copolymerize ethylene with a minor amount of a diene to produce a high density polyethylene resin.

The process of the invention further provides for the use of such catalyst systems to polymerize ethylene, or a mixture of ethylene and one or more other 1-olefins or diolefins copolymerizable with ethylene. In these process embodiments, a vanadium-containing catalyst component of one of the types described above is employed with an organoaluminum cocatalyst. In another process embodiment, the invention involves use of the catalyst system for polymerizing ethylene, or a mixture of ethylene and one or more other 1-olefins or diolefins copolymerizable with the ethylene, comprising a vanadium containing catalyst component (I), and organoaluminum cocatalyst (II), and a diene catalyst modifier (III). The catalyst component (I) is obtained by treating an inert solid support material in an inert solvent with an organoaluminum compound (B) represented by the formula $R_mAlX_{3-m}$ wherein R represents a hydrocarbyl radical, X represents a halogen atom and "m" represents a number equal to or greater than 1 and less than or equal to 3, optionally a halogenating agent (C), a vanadium compound (A), and an organophosphorous compound (D). The diene catalyst modifier (III) may be used in an amount up to the quantity which can be loaded into the support, either as monomer or prepolymerized.

The invention comprises a polymerization process in which one of the described catalyst systems is contacted under polymerizing conditions with ethylene or a mixture of ethylene with one or more 1-olefins or diolefins copolymerizable with the ethylene.

In a preferred embodiment of the invention, the vanadium compound (A) is a hydrocarbon-soluble vanadium compound in which the vanadium valence is 3 to 5. Mixtures of the vanadium compounds may be employed. The use of a halogenating agent is optional, but desirable. The halogenating agents (C) are chosen from chlorinating, brominating and iodinating agents. The halogenating agents may be selected from weak or strong halogenating agents. The strong halogenating agents enhance catalytic activity.

Although, in preparing a catalyst system which is useful in accordance with this invention, the order of addition of ingredients in forming the vanadium containing catalyst component may vary, the catalyst component is preferably prepared by either reacting the organoaluminum compound (B) with the inert solid support material which is preferably a Group IIa, IIIa, IVa or IVb metal oxide or a finely divided polyolefin or other suitable support material, and thereafter subjecting the system to treatment with the halogen containing compound (C) followed by treatment with the vanadium compound (A), then with the organophosphorous compound (D), or in the alternative reacting the vanadium compound (A) with the support and thereafter subjecting the system to treatment with the organoaluminum compound (B) and then, optionally, the halogen containing compound (C), followed by the organophosphorous compound (D).

In view of the high activity of the catalyst systems utilized in accordance with this invention as compared with conventional vanadium based catalysts, it is generally not necessary to deash polymer product since polymer product will generally contain lower amounts of catalyst residues than polymer products produced in the presence of conventional catalysts.

This invention comprises the polymerization of ethylene with a minor amount of a diene in the presence of a catalyst system as described to produce a high density polyethylene resin which has a low content of n-paraffins while having an MIR of at least 75 or greater. The polymerization process may be carried out as a gas phase process, single phase melt process, solvent process or slurry process. Supported catalyst systems as described are particularly useful for copolymerizing ethylene with minor amounts of a diene in gas phase polymerization procedure to produce high density polyethylene ("HDPE") resins which by reason of their low oligomer content and relatively high MIR values, are particularly well suited as blow molding resins, particularly for the production of household and industrial containers.

DESCRIPTION OF THE PREFERRED EMBODIMENTS

Briefly, the catalyst components used in the process of the present invention comprise the solid reaction product obtained on treating an inert solid support material in an inert solvent, preferably sequentially, with a vanadium compound (A), an organoaluminum compound (B), optionally a halogenating agent (C), and an organophosphorous compound (D). In another embodiment, the inert solid support material, treated with the organoaluminum compound (B), optionally the halogenating agent (C), the vanadium compound (A), and the organophosphorous compound (D), is a component in a catalyst system which employs a diene as a catalyst modifier and as a monomer for copolymerization with ethylene (E), in the presence of an organoaluminum cocatalyst. In another embodiment the catalyst component is a prepolymerized solid reaction product obtained by treating an inert solid support material in an inert solvent sequentially with the organoaluminum compound (B), optionally, the halogenating agent (C), the vanadium compound (A), and the organophosphorous compound (D), followed by prepolymerizing the treated solid with a amount of ethylene in the presence of the diene (E).

Typically, the inert solid support material can be any of the solid particulate porous supports such as talc, silica, zirconia, thoria, magnesia, and titania. Preferably the support material is a Group IIa, IIIa, IVa and IVb metal oxide in finely divided form. Suitable inorganic oxide materials, which are desirably employed in accordance with this invention include silica, alumina, and silica-alumina and mixtures thereof. Other inorganic oxides that may be employed either alone or in combination with silica, alumina or silica-alumina are magnesia, titania, zirconia, and the like. Other suitable support materials, however, can be employed, for example, finely divided polyolefins such as finely divided polyethylene.

The metal oxide support materials generally contain acidic surface hydroxyl groups which will react with the organometallic composition or transition metal compound first added to the reaction solvent. Prior to use, the inorganic oxide support is dehydrated, i.e., subjected to a thermal treatment in order to remove water and reduce the concentration of the surface hydroxyl groups to the desired level. The support dehydration treatment is carried out under vacuum or while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed provided equilibrium is established with the surface hydroxyl groups.

Chemical dehydration as an alternative method of dehydration of the metal oxide support material can advantageously be employed. Chemical dehydration converts all water and hydroxyl groups on the oxide surface to inert species. Useful chemical agents are, for example $SiCl_4$, chlorosilanes, silylamines and the like. The chemical dehydration is accomplished by slurrying the inorganic particulate material, such as silica gel, in an inert hydrocarbon solvent, such as, for example, heptane. With a silica gel support material as an example, during the dehydration reaction the silica should be maintained in a moisture and oxygen-free atmosphere. To the silica slurry is then added a low boiling inert hydrocarbon solution of the chemical dehydrating agent, such as, for example, dichlorodimethylsilane. The solution is added slowly to the slurry. The temperature range during the chemical dehydration reaction can be from about 25° C. to about 120° C., however, higher and lower temperatures can be employed. Preferably the temperature will be from about 50° C. to about 70° C. The chemical dehydration procedure should be allowed to proceed until all the moisture is removed from the particulate support material, as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen-free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The (B) organoaluminum compounds employed in this invention can be represented by the general formula $R_mAlX_{3-m}$ wherein R represents an alkyl group, cycloalkyl group or aryl group, X represents a halogen atom and "m" represents a suitable numeral equal to or greater than 1 and less than or equal to 3, or mixtures or complex compounds thereof. In particular, it is preferable to employ alkyl aluminum compounds wherein the alkyl groups have from 1 to 18 carbon atoms, preferably 1 to 9 carbon atoms. Illustrative but non-limiting examples of the organoaluminum compounds which may be suitably employed are the trialkylaluminums such as trimethylaluminum, triethylaluminum, tributylaluminum, triisobutylaluminum, tri-n-pentylaluminum, tri-n-octylaluminum, and the like. Illustrative examples of the dialkylaluminum halides are diethylaluminum, chloride, diethylaluminum fluoride, dimethylaluminum chloride, dibutylaluminum chloride, diethylaluminum bromide, diethylaluminum iodide and dibutylaluminum iodide. Examples of the monoalkylaluminum dihalides are methylaluminum dichloride, ethylaluminum dichloride, butylaluminum dichloride, isobutylaluminum dichloride, ethylaluminum dibromide, ethylaluminum diiodide, butylaluminum dibromide, and butylaluminum diiodide. Moreover, the sesquihalides can be suitably employed such as methylaluminum sesquichloride and ethylaluminum sesquichloride and the like.

The aluminum alkyls can be conveniently added in liquid form to the agitated slurry containing the inert particulate support such as silica, either in solution, e.g., in inert solvents such as hexane, benzene, toluene, etc. or alternatively, the aluminum alkyl can be added to the slurry in undiluted form.

In accordance with this invention, the optional halogenating agents are employed to obtain increased catalytic activity over similar catalyst systems absent the halogenating agent. The halogenating agents may be used to increase activity without detrimentally affecting the molecular weight distributions obtainable in accordance with this invention in which the content of oligomer is reduced. The halogenating agents which can be employed are chlorinating, brominating and iodinating agents. The halogenating agents are desirably strong halogenating agents, although weaker halogenating agents may be used with the result that generally broader molecular weight distributions are obtained. The halogenating agents can be liquid or gaseous under the reaction conditions.

Illustrative but non-limiting examples of the strong halogenating agents that can be usefully employed in accordance with this invention are the silicon halides and the hydrocarbyl halides, the hydrocarbyl halides preferably contain 1-3 carbon atoms.

The silicon halides can be represented by the formula $X_aSiR_b$ in which X is a halogen, R is an alkyl, cycloalkyl or aryl radical containing 1 to 20 carbon atoms, "a"+"b"=4 and "a" is at least 1. Illustrative examples of the silicon compounds are silicon tetrachloride, silicon tetrabromide, chlorosilanes such as, for example, trimethylchlorosilane, dimethyldichlorosilane, ethyltrichlorosilane, diethyldichlorosilane, dichlorodibutylsilane, trichlorobutylsilane, tribromobutylsilane, bromotrimethylsilane, and the like.

The hydrocarbyl halides include carbon tetrachloride, chloroform, 1,1,1-trichloroethane, dichloromethane, trichlorofluormethane and the like.

The preferred chlorinating agents are strong activating chlorinating agents, among which the most preferred are silicon tetrachloride trichlorofluoromethane, trichloroethane and the like. Illustrative of weak activating chlorinating agents are the thionyl halides, such as $SOCl_2$.

The halogen-containing compound is conveniently added to the reaction slurry, which comprises the solid particulate material, or the solid reaction product from the treatment of the solid particulate material and the aluminum alkyl. The addition of the halogen containing compound can be effected by using a solution of the halogen-containing compound in an inert solvent such as for example, an aliphatic hydrocarbon solvent or an aromatic hydrocarbon solvent. The halogen-containing-compound can also be added as a gas. The halogen-containing compound can also be added at two separate steps during the catalyst component preparation, for example, after the aluminum alkyl treatment and thereafter after the vanadium compound treatment.

The vanadium compounds (A) which can be usefully employed in the preparation of the vanadium containing catalyst component are well known in the art and can be represented by the formulas

where "x" is a number from 0 to 3 and R is a hydrocarbon radical;

where "y" is a number from 3 to 4 and R is a hydrocarbon radical;

where "z" is a number from 2 to 3 and (AcAc) is acetyl acetonate group

where (AcAc) is an acetyl acetonate group; and

where "n" is a number from 2 to 3 and B is a Lewis base, such as tetrahydrofuran, which can form hydrocarbon-soluble complexes with $VCl_3$.

In formulas (1) and (2) above, R' preferably represents a $C_1$ to $C_8$ aliphatic radical free of aliphatic unsaturation or aromatic hydrocarbon radicals such as straight or branched alkyl, aryl, cycloalkyl, alkanyl, or aralkyl group, such as methyl, ethyl, propyl, isopropyl, butyl, n-butyl, i-butyl, t-butyl, pentyl hexyl, cyclohexyl, octyl, benzyl, dimethyl, phenyl, naphthyl, etc.

Illustrative, but non-limiting examples of the vanadium compounds are vanadyl trichloride, vanadium tetrachloride, tetrabutoxyvanadium, vanadium trichloride, vanadyl acetylacetonate, vanadium acetylacetonate, vanadyl dichloroacetylacetonate, vanadyl chlorodiacetylacetonate, vanadium trichloride complexed with tetrahydrofuran, vanadyl tribromide, vanadium tetrabromide, vanadyl di-butoxychloride and the like.

The vanadium compound is preferably added to the reaction mixture in the form of a solution. The solvent can be any of the well known inert hydrocarbon solvents such as hexane, heptane, benzene, toluene, and the like.

The organophosphorous compounds (D) which can be usefully employed in the preparation of the vanadium containing catalyst component are the tri-substituted phosphines (A1) and phosphine oxides (B1) and the phosphite esters (C1), as represented by the formulas:

| (A1-1) | PR"$_3$: | trihydrocarbyl phosphine; |
|---|---|---|
| (A1-2) | P(NR"$_2$)$_3$: | tris(N,N'dihydrocarbylamino) phosphine |
| (B1-1) | $\overset{O}{\underset{\|}{P}}(OR")_3$: | trihydrocarboxy phosphine oxide [also named as a "trialkyl-phosphate"]; |
| (B1-2) | $\overset{O}{\underset{\|}{P}}R"(OR")_2$: | hydrocarbyl dihydrocarboxy phosphine oxide [also named as an "alkyl dialkylphosphonate"]; |

| | | |
|---|---|---|
| (B1-3) | O<br>‖<br>PR″₂(OR″): | dihydrocarbyl hydrocarboxy phosphine oxide [also named as a "dialkyl alkylphosphonate"]; |
| (B1-4) | O<br>‖<br>PR″₃: | trihydrocarbyl phosphine oxide; |
| (B1-5) | O<br>‖<br>P(NR″₂)₃: | tris(N,N'dihydrocarbyl amino) phosphine oxide [also named as an "alkylphosphoramide"]; |
| (C1-1) | P(OR″)₃: | trihydrocarboxy phosphine [also named as a "trialkylphosphite"]. |

In the formulas above, R″ represents a hydrocarbyl radical, preferably a $C_1$ to $C_{10}$ aliphatic radical free of aliphatic unsaturation, or an aromatic hydrocarbon radical, and includes a straight or branched chain alkyl, aryl, cycloalkyl, alkanyl, aralkyl group such as methyl, ethyl, propyl, iospropyl, butyl, n-butyl, i-butyl, t-butyl, pentyl hexyl, cyclohexyl, octyl, benzyl, dimethyl phenyl, naphthyl, etc.

Illustrative, but non-limiting examples of the organophosphorous compounds are trimethylphosphine oxide, triethylphosphine oxide, tri-n-propylphosphine oxide, tri-n-butylphosphine oxide, tri-n-octylphosphine oxide, triphenylphosphine oxide, diethyl ethylphosphonate, diethyl methylphosphonate, dimethyl methylphosphonate, di-n-butyl butylphosphonate, trimethylphosphate, triethylphosphate, triphenylphosphate, tri-n-propylphosphate, tri-n-butylphosphate, trimethylphosphine, triethylphosphine, tri-n-butylphosphine, triphenylphosphine, hexamethylphosphoramide, hexapropylphosphoramide, hexa-n-butylphosphoramide, trimethylphosphite, triethylphosphite, tri-n-butylphosphite, tri-n-hexylphosphite, tri-n-octylphosphite, and the like.

The organophosphorous compound is preferably added to the reaction mixture in the form of a solution, but where the organophosphorous compound is a liquid, it may be added in an undiluted form. The solvent can be any inert hydrocarbon solvent such as hexane, heptane, benzene, toluene, and the like.

The diene (E) which can be usefully employed in the process of this invention as a monomer for copolymerization with ethylene, or in the preparation of the vanadium containing catalyst component, including the prepolymerized catalyst component contains at least 4 carbon atoms. Among dienes suitably used in this invention are butadiene, isoprene 2-methyl-1,3-butadiene, 1,4-pentadiene, 1,4-hexadiene, 1,5-hexadiene, 1,7-octadiene, 1,9-octadiene, dicyclopentadiene, ethylidene norbornene, or mixtures thereof.

The treatment of the support material is conducted in an inert solvent. The inert solvent can be the same as that employed to dissolve the individual ingredients prior to the treatment step. Preferred solvents include mineral oils and the various hydrocarbons which are liquid at reaction temperatures and in which the individual ingredients are soluble. Illustrative examples of useful solvents in addition to those mentioned above include, the alkanes, such as pentane, iospentane, hexane, heptane, octane, and nonane; cycloalkanes such as cyclopentane and cyclohexane; and aromatics such as benzene, toluene, ethylbenzene and diethylbenzene. The amount of solvent employed is not critical. Nevertheless, the amount employed should be sufficient so as to provide adequate heat transfer away from the catalyst during reaction and to permit good mixing.

The amounts of catalytic ingredients employed in the preparation of the solid catalyst component can vary over a wide range. The vanadium compound is added to the inert support reaction slurry at a concentration of about 2.0 to about 0.05 millimoles of vanadium per gram (V/g) of dried support, preferably in the range of about 1.4 to about 0.14 millimoles V/g of dried support, most especially preferably in the range of about 0.2 to 0.8 millimoles V/g dried support. The support is dried at a temperature between 300° and 800° C. using methods well known to those skilled in the art.

The concentration of aluminum alkyl deposited on the essentially dry, inert support can be in the range from about 0.1 to about 3 millimoles/g of support, however, greater or lesser amounts can be usefully employed. Preferably, the organoaluminum compound concentration is in the range of 0.1 to 2.0 millimoles/g of support, and more preferably in the range from about 0.4 to 1.3 millimoles/g of support.

The amount of optional halogenating agent employed should be such as to provide a halogen to aluminum mole ratio of about 1 to about 100 and preferably 4 to 40.

The organophosphorous compound is added to the reaction slurry at a concentration sufficient to give a P/V mole ratio of about 0.01 to 100, preferably in the range of about 0.1 to 10, and especially in the range of about 0.2 to 2.0.

As noted before, in the process of this invention the diene is a monomer which copolymerizes, in the presence of a catalyst system as described, in minor amounts with ethylene to yield a high density polyethylene resin having a low n-paraffin content while also having an MIR of at least 75 or greater. Correspondingly, the catalyst itself may be prepared to have as a constituent element a diene component. When such a catalyst is so prepared, the diene is reacted along with ethylene as a last step in the process of treating the solid support material, or in the prepolymerizing step as respects the prepolymerized solid catalyst component, generally in amounts of from 0.1 to about 100 moles, per gram of vanadium, preferably, from about 0.1 to 10 moles, per gram of vanadium in the catalyst component. When used with a catalyst system having a vanadium-containing catalyst component not treated with the diene, the diene is employed as a comonomer in the polymerization in a quantity suitably from about 0.005 to about 0.1 moles of diene per mole of ethylene.

Generally, in preparing the catalyst the individual reaction steps can be conducted at temperatures in the range of about −50° C. to about 150° C. Preferred temperature ranges are from about −30° C. to about 60° C. with −10° C. to about 50° C. being most preferred. The reaction time for the individual treatment steps can range from about 5 minutes to about 24 hours. Preferably the reaction time will be from about 1.2 hour to about 8 hours. During the reaction constant agitation is desirable. In the preparation of the vanadium metal-containing solid catalyst component, washing after the completion of any step may be effected.

In practice of the process of this invention the organophosphorous modified vanadium catalyst is usefully employed with organometallic cocatalysts well know in the art of the Ziegler catalyst systems for use with the transition metal containing catalyst component. Such organometallic compounds are Group Ia, IIa and IIIa metals such as aluminum alkyls, aluminum alkyl hydrides, lithium aluminum alkyls, zinc alkyls, magnesium alkyls and the like. The cocatalysts preferably used are the organoaluminum compounds. The preferred organoaluminum compounds are alkylaluminum compounds represented by the formula $AlR^*_e X'_{3-e}$ wherein $R^*$ is a hydrocarbyl or substituted hydrocarbyl group, $X'$ is a halogen, and "e" is a number equal to or greater than 1 and less than or equal to 3. Preferably $R^*$ is an alkyl group having from 2 to 10 carbon atoms. Preferably the halogen is chlorine. Illustrative examples of the cocatalyst material are ethylaluminum dichloride, ethylaluminum sesquichloride, diethylaluminum chloride, triethylaluminum tributylaluminum, diisobutylaluminum hydride, diethylaluminum ethoxide and the like. Trialkylaluminum compounds are most preferred with triisobutylaluminum and triethylaluminum being highly desirable.

The catalyst system comprising the aluminum alkyl cocatalyst and the vanadium metal containing solid catalyst component is employed for the polymerization of ethylene, other 1-olefins having from 3 to 20 carbon atoms, such as for example, propylene, butene-1, pentene-1, hexene-1, 4-methylpentene-1, and the like and ethylene copolymers with a minor amount of a diene such as 1,4-pentadiene, 1,5-hexadiene, butadiene, 1,7-octadiene, 2-methyl-1,3-butadiene and the like. The catalyst system may be employed to produce high density copolymers of ethylene. The catalyst is especially useful for the preparation of high molecular weight polyethylene resins of reduced n-paraffin content. Typically the polymers will have melt indexes (MI) values from 0.01–1.0 and MIR values from about 75 to about 200. The olefins can be polymerized in the presence of the catalysts by any suitable known process such as, for example, solution or slurry processes and gas-phase processes.

Catalyst systems as above described are used to polymerize minor amounts of a diene with a 1-olefin, particularly ethylene, to produce a high density polyolefin, particularly polyethylene, which has a low oligomer content while having an MIR of at least 75. Generally the amount of diene incorporated into the polyethylene resin produced may range up to about 10, preferably 5, more preferably 3 weight percent yet the density of the polyethylene will still be maintained at about 0.94 g/cc or greater, permitting its use for high density polyethylene application. As a result of incorporating such minor amounts of diene as a comonomer the processability of a the product polyethylene resin as a blow molding resin is preserved by reason of the high MIR value of the resin while the objectionable smoking causing n-paraffin content of the resin is greatly reduced or eliminated. The n-paraffin content of a polyethylene resin produced in accordance with the process of this invention will typically be less than 0.2 wt %.

The polymerization reaction employing catalytic amounts of the above-mentioned solid catalyst can be carried out under conditions well know in the art of Ziegler polymerization, for example, in solution or slurry processes at a temperature in the range of 50° C. to 200° C. and at a pressure of 1 to 40 atmospheres typically at temperatures from 80° C. to 200° C. and pressures from 10–30 atmospheres, and in the gas phase, at a temperature range of 70° to 100° C. at pressures in the range of about 1 to 50 atmospheres and upward, typically 18 atmospheres. Illustrative of the gas-phase processes are those disclosed in U.S. Pat. Nos. 4,302,565 and 4,302,566, which references are hereby incorporated in their entirety by reference. As indicated above, one advantageous property of the catalyst system as used in the process of this invention is the reduced amount of gas-phase reactor fouling. The catalyst system can also be used to polymerize olefins at single-phase conditions, i.e., 150° C. to 320° C. and 1,000–3,000 atmospheres. At these conditions the catalyst lifetime is short but the activity sufficiently high that removal of catalyst residues from the polymer is unnecessary. However, it is preferred that the polymerization be done at pressures ranging from 1 to 50 atmospheres, preferably 5 to 25 atmospheres.

Improved yields can be further obtained by employing polymerization promoters (activators) in combination with the catalyst system. The polymerization activators, in accordance with this invention, are preferably chlorocarbon activators. The activators are generally added to the polymerization reactor as a separate component. However, in the alternative, the activator can be adsorbed onto the surface of the catalyst component. The activator serves to significantly increase the productivity of the catalyst. Illustrative but non-limiting examples of the chlorocarbons are $CHCl_3$, $CFCl_3$, $CH_2Cl_2$, ethyltrichloroacetate, methyltrichloroacetate, hexachloropropylene, butylperchlorocrotonate, 1,3-dichloropropane, 1,2,3-trichloropropane, and 1,1,2-trichlorotrifluoroethane, etc. The activators may be gases or liquids at the conditions of polymerization.

In the processes according to this invention it has been observed that the catalyst system is highly responsive to hydrogen for the control of molecular weight. Other well known molecular weight controlling agents and modifying agents, however, may be usefully employed.

The polyolefins prepared in accordance with this invention can be extruded, mechanically melted, cast or molded as desired. They can be used for plates, sheets films and a variety of other objects.

While the invention is described in connection with the specific examples below, it is understood that these are only for illustrative purposes. Many alternatives, modifications and variations will be apparent to those skilled in the art in light of the below examples and such alternatives, modifications and variations fall within the general scope of the claims.

In the Examples following the silica support is prepared by placing Davison Chemical Company silica gel in a vertical column and fluidizing with an upward flow of $N_2$. The column is heated slowly to between 400° and 800° C. and held at that temperature for 12 hours after which the silica was cooled to ambient temperature.

The melt index (MI) and melt index ratio (MIR) are measured in accordance with ASTM test D1238. N-paraffin content for all of the resins were obtained as follows: 3.0 grams of the resin were weighed into a crown-cap tube and 20 ml of 1.0 weight percent nonane in hexane were added to the tube. The tube was capped and placed in a water shaker bath and extracted at 50° C. for 3 hours. The sample was then cooled to room temperature and filtered. A portion of the filtrate was loaded into a GC sample vial and submitted for analysis on a HP 5880A GC equipped with a glass capillary column. The $C_{10}$–$C_{32}$ n-paraffins were identified with a standard solution of even-numbered $C_{10}$–$C_{32}$ n-paraffins, and area percents were converted to weight percents by applying the appropriate response factor corrections for the various carbon numbers. The cumulative $C_{10}-C_{32}$ weight percent n-paraffin could then be compared to the nonane internal standard (sometimes a $C_{15}$ standard was also used) to obtain an absolute weight of paraffins, from which the weight percent $C_{10}-C_{32}$ in the polymer were calculated. Extractions of samples in the shaker bath generally showed that the extraction was farily efficient; for example, 80% of the total amount extracted in 6 hours was typically obtained in the first 3 hours of extraction. The repeatability of the test was good, and $C_{10}-C_{32}$ n-paraffin content was not a function of other extraction efficiency variables such as polymer average particle size.

COMPARATIVE EXAMPLE 1 (CONTROL "A")

Example 1 illustrates the performance of a prior art vanadium based catalyst which yields a broad molecular weight distribution polyethylene product containing objectionable levels of $C_{10}-C_{32}$ n-paraffin. For any given catalyst system the level of $C_{10}-C_{32}$ n-paraffin is a function of the resin molecular weight, as well as resin MWD, and therefore comparisons should be made at similar molecular weights or similar melt indexes. Since $C_{10}-C_{32}$ n-paraffin content decreases the the melt index decreases, the comparison of invention examples with Control A in Table I are considered worst case comparisons.

Preparation of Catalyst Component

A 5 g portion of Davison 948 silica which was dehydrated at 500° C. is charged into a 125 ml serum vial equipped with a magnetic stirring bar. A volume of 20 ml of dry, degassed hexane is added via a syringe and the suspension is stirred.

To the stirred suspension is added 3.5 mmoles of vanadyl trichloride in 5 ml of hexane solution. The slurry is stirred at ambient temperature for 1 hour. To the reaction is then added 6.8 mmoles of triethylaluminum in 4.3 ml of heptane solution. The reaction slurry is stirred at ambient temperature for 1 hour. To the reaction slurry is then added via syringe 13.8 mmoles of neat benzoyl chloride at ambient temperatures with constant stirring. The reaction is stirred for 1 hour at ambient temperatures. Stirring is discontinued, and the catalyst dried by passing a stream of dry nitrogen through the vial so that solvents and other volatile components are evaporated.

Polymerization

To a 2.1 liter autoclave is charged 800 ml of purified isobutane, 1.5 ml of triethylaluminum (1.58M) in heptane solution and 1.5 ml of trichlorofluoromethane. The temperature of the reactant is raised to 80° C., 50 mmoles of hydrogen are added and reactor is pressured to 325 psig with ethylene. The polymerization is initiated by injection of 100 mg of the dry catalyst into the reactor. The pressure is maintained by constant flow of ethylene. Polymerization is maintained for 40 minutes after which time the reactor is vented to atmospheric pressure, cooled, and the polymer is isolated by evaporation of the isobutane diluent. The polymerization is maintained for 40 minutes resulting in a 41 gram yield of polymer product having an MI of 0.25 dg/minute, an HLMI of 23.6 dg/minute, an MIR of 94 and a $C_{10}-C_{32}$ n-paraffin content of 0.293 weight percent.

COMPARATIVE EXAMPLE 2 (CONTROL "B")

Example 2 illustrates the performance of a modified vanadium based catalyst which yields a narrow molecular weight distribution polyethylene resin of reduced n-paraffin content prepared according to the invention described in U.S. Pat. No. 5,262,372 referred to above.

Preparation of Catalytic Component

Silica gel (800 g Davison G952 silica dehydrated at 500° C.) is charged to a two gallon mixed and slurried in about 2550 ml of degassed and dried isopentane. The temperature of the mixture is then increased to 41° C. To the stirred slurry is then charged, over a period of about 45 minutes, 0.77 mmoles of vanadyl trichloride per gram of silica as a 0.7 M solution in isopentane. The reaction slurry is maintained at 41° C. for 1 hour with good stirring, after which time the mixture is allowed to settle and the supernatant is decanted. The resulting solid is washed once with 2500 ml of fresh isopentane for 15 minutes at 31° C., and the slurry is settled again, decanted, and reslurried in 2500 ml of isopentane. Over 45 minutes and with good agitation, 1.2 mmoles of isobutylaluminum dichloride per gram of silica are added as a 25 weight percent solution in heptane at a reaction temperature of 32° C. The mixture is allowed to react at 32° C. for a period of 1 hour after which time 4.87 mmoles of $SiCl_4$ per gram of silica are added. The addition is completed in 30 minutes and the mixture is allowed to react for 1 hour at 32° C. The stirring is discontinued, the slurry allowed to settle, the supernatant decanted, and the catalyst is dried under flowing nitrogen.

Two grams of the dried catalyst are slurried in 15.4 ml of hexane and tributylphosphine oxide ("TBPO") is added as an 0.1M solution in hexane to give the TBPO/V mole ratio of 1.29. Enough hexane is added to the slurry to keep the volume of liquid constant at 30 ml. The slurry is stirred at room temperature for 2 hours, and the allowed to settle, followed by decantation of the supernatant. The solid is washed once with 20 ml of fresh hexane, the wash discarded, and the catalyst is dried to a freely flowing solid flowing nitrogen at room temperature.

Polymerization

The same polymerization conditions are employed as in Example 1 except 25 mmoles of hydrogen are used. The reaction yields 68 grams of polyethylene having a melt index of 0.83 dg/min, a melt index ratio of 57 and 0.199 weight percent of $C_{10}-C_{32}$ n-paraffin.

EXAMPLES 3 AND 4

Examples 3 and 4 illustrate the process of the invention.

A catalyst is prepared and treated with TBPO as described in Example 2, and ethylene homopolymerizations are conducted according to the procedure of Example 2, except that in Example 3, 4 ml of 1,7-octadiene (and 30 instead of 25 mmoles hydrogen), and in Example 4, 5 ml of 1,7-octadiene, are charged to the reactor before addition of ethylene and hydrogen. The results, which are set forth in Table I, along with the results of Examples 1 and 2, show that the melt index ratio of the polyethylene product produced in Examples 3 and 4 is increased compared to the reduced melt index ratio of the resin of Example 2, to a level comparable to the melt index ratio of the broad molecular weight distribution polyethylene resin of Example 1, while still achieving the desirable reduced n-paraffin content of Example 2. The decrease in oligomer content while maintaining MIR at a value greater than 75 is accomplished without significant reduction of the resin density as compared to the high density homopolyethylene resin produced in Examples 1 and 2.

Example 2, and the finished catalyst was isolated, also as described in Example 2.

TABLE I

| Example No. | Diene (ml) | Hexene (ml) | H$_2$ MMoles | Yield (grams) | MI | HLMI | MIR | n-paraffin (wt. %) | Density (g/cc) |
|---|---|---|---|---|---|---|---|---|---|
| 1 | 0 | 0 | 50 | 41 | 0.25 | 23.6 | 94 | 0.293 | 0.9632 |
| 2 | 0 | 0 | 25 | 68 | 0.83 | 47.7 | 57 | 0.199 | 0.9630 |
| 3 | 4 | 0 | 30 | 75 | 0.51 | 40.8 | 80 | 0.176 | 0.9598 |
| 4 | 5 | 0 | 25 | 80 | 0.45 | 37.8 | 84 | 0.161 | 0.9579 |
| 5 | 0 | 0 | 25 | 26 | 0.33 | 22.6 | 69 | — | — |
| 6 | 4 | 10 | 25 | 87 | 0.66 | 57.8 | 88 | 0.182 | 0.9534 |
| 7 | 4 | 10 | 25 | 64 | 0.43 | 33.6 | 78 | 0.163 | 0.9544 |
| 8 | 4 | 10 | 20 | 53 | 0.25 | 18.7 | 75 | 0.133 | 0.9542 |

EXAMPLE 5

Catalyst Preparation

A vanadium-containing catalyst component is prepared identically as in Example 2. 1 gram of the catalyst was then loaded in a dry box into a polymerization tube, 110 ml of hexane and 1.0 ml of 1,7-octadiene were injected into the tube, and the tube pressure was raised 2 psig with ethylene. 0.5 ml of TEAL (1.56M in heptane) was then injected so that polymerization at room temperature would begin. By weight loss of the ethylene cylinder, it was determined that in 15 minutes 1.05 grams of ethylene was prepolymerized on the catalyst. The prepolymerized catalyst was washed three times in isopentane and dried with flowing nitrogen.

Polymerization

The prepolymerized catalyst was polymerized as in Example 2. The comparison shows only a slight increase in MIR, but illustrates the concept of incorporating the diene into a catalyst by prepolymerization or other means to obtain an increase in MIR without adding diene to the reactor separately. Increased levels of diene, higher prepolymerization temperatures, and longer prepolymerization times would be expected to enhance the effect by incorporating more diene in the prepolymerization. Examples 6, 7 and 8 illustrate the capability of the process of the present invention to obtain high density ethylene/α-olefin copolymers having a significantly reduced n-paraffins level while retaining a relatively high MIR. Examples 7 and 8 also illustrate the use of an alternative organophosphorous compound.

EXAMPLE 6

A catalyst is prepared as in Example 2 and the polymerization is carried out as in Example 3, except that 10 ml of 1-hexene are added to the polymerization reaction and 25 mmoles of hydrogen are used instead of 30 mmoles. In Table 1, it can be seen that in spite of a significantly higher melt index, the level of n-paraffin is lower than the "Control A" and the MIR is only slightly reduced.

EXAMPLE 7

Catalyst Preparation

The catalyst is prepared exactly as in Example 2, except for the addition of the organophosphorous compound, which is as follows: 14.6 ml of 0.1 M hexamethylphosphoramide (HMPA) in hexane is added to 2 g of the dried catalyst which has been slurried in 15.4 ml of hexane as before (30 ml total volume). The HMPA was allowed to react in the same fashion as the TBPO in

Polymerization

The polymerization was carried out as in Example 6 and the results are set forth in Table 1. The MIR remains proportionately high with a lower n-paraffin level, in spite of a higher melt index.

EXAMPLE 8

Example 7 was repeated except that 20 mmoles of H$_2$ were used. The MIR is reduced by about 20 percent whereas the n-paraffin level is reduced by 55 percent.

The invention has been described with reference to its preferred embodiments. Those of ordinary skill in the art may appreciate changes and modifications which may be made to the invention which do not depart from the scope and spirit of the invention as described above or claimed hereafter.

I claim:

1. In a process for producing a high density polyethylene comprising the steps of polymerizing ethylene in the presence of a vanadium catalyst system and an organoaluminum cocatalyst, wherein said vanadium catalyst system is comprised of the solid reaction product prepared by treating an inert solid support material in an inert solvent with a vanadium compound, an organoaluminum compound, and an organophosphorus compound, the improvement which comprises prepolymerizing the treated solid support with a small amount of ethylene, in the presence of from about 0.1 to about 100 moles of an aliphatic diene per gram of vanadium, said aliphatic diene containing at least four carbon atoms, wherein said polyethylene has less than about 0.2 weight percent C$_{10}$ to C$_{32}$ n-paraffin content and a melt index ratio (MIR) of at least 75.

2. The process of claim 1 further comprising the step of treating said inert solid support with a halogenating agent.

3. The process of claim 2 wherein said vanadium catalyst system is obtained by treating an inert solid support material in an inert solvent with a vanadium compound represented by the formulas:

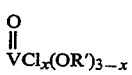

where "x" is a number from 0 to 3 and R' is a hydrocarbon radical,

where "y" is a number from 3 to 4 and R is a hydrocarbon radical,

where "z" is a number from 2 to 3 and (AcAc) is an acetyl acetonate group,

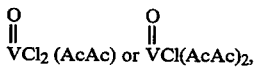

where (AcAc) is an acetyl acetonate group, and

where "n" is a number from 2 to 3 and B is a Lewis base which can form hydrocarbon-soluble complexes with VCl$_3$; and an organophosphorous compound represented by the general formulas:

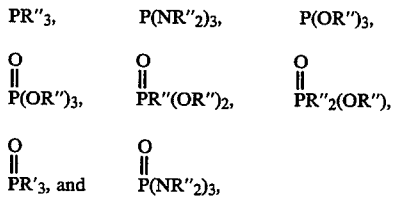

in which R" is a hydrocarbon radical.

4. The process of claim 3, wherein said organoaluminum compound is represented by the formula R$_m$AlX$_{3-m}$, wherein R represents an alkyl group, cycloalkyl group or aryl group, X represents a halogen atom and "m" represents a number equal to or greater than 1 and less than or equal to 3.

5. The process of claim 4 wherein said halogenating agent is selected from the group consisting of silicon halides and hydrocarbyl halides having from 1 to 3 carbon atoms.

6. The process of claim 5, wherein said high density polyethylene resin has a density of at least about 0.94 g/cc.

7. The process of claim 6, wherein the diene is butadiene, 2-methyl-1,3-butadiene, isoprene, 1,4-pentadiene, 1,4-hexadiene, 1,5-hexadiene, 1,7-octadiene, 1,9-octadiene, or mixtures thereof.

8. A process for producing high density polyethylene comprising the step of polymerizing ethylene with a minor amount of an aliphatic diene having at least four carbon atoms, in the presence of a vanadium catalyst system and an organoaluminum cocatalyst, wherein said vanadium catalyst system is comprised of the solid product prepared by treating an inert solid support material with a vanadium compound, an organoaluminum compound, an organophosphorus compound, and a halogenating agent, wherein said polyethylene has less than about 0.2 weight percent C$_{10}$ to C$_{32}$ n-paraffin content and a melt index ratio (MIR) of at least 75.

9. The process of claim 8 wherein said diene contains at least 4 carbon atoms, and is present in said vanadium catalyst system from about 0.1 to about 100 moles per gram of vanadium.

10. The process of claim 9 wherein said vanadium containing catalyst system is obtained by treating an inert solid support material in an inert solvent with a vanadium compound represented by the general formulas:

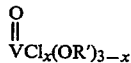

where "x" is a number from 0 to 3 and R' is a hydrocarbon radical,

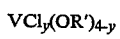

where "y" is a number from 3 to 4 and R is a hydrocarbon radical,

where "z" is a number from 2 to 3 and (AcAc) is an acetyl acetonate group,

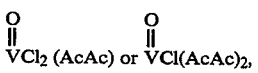

where (AcAc) is an acetyl acetonate group, and

where "n" is a number from 2 to 3 and B is a Lewis base which can form hydrocarbon-soluble complexes with VCl$_3$; and an organophosphorous compound represented by the general formulas:

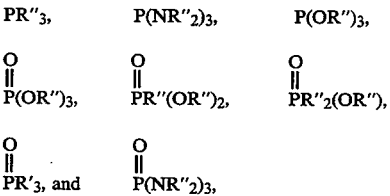

in which R" is a hydrocarbon radical.

11. The process of claim 10, wherein said organoaluminum compound is represented by the formula R$_m$AlX$_{3-m}$, wherein R represents an alkyl group, cycloalkyl group or aryl group, x represents a halogen atom and "m" represents a number equal to or greater than 1 and less than or equal to 3.

12. The process of claim 11 wherein said halogenating agent is selected from the group consisting of silicon halides and hydrocarbyl halides having from 1 to 3 carbon atoms.

13. The process of claim 12, wherein said high density polyethylene resin has a density of at least about 0.94 g/cc.

14. The process of claim 13, wherein the diene is butadiene, 2-methyl-1,3-butadiene, isoprene, 1,4-pentadiene, 1,4-hexadiene, 1,5-hexadiene, 1,7-octadiene, 1,9-octadiene, or mixtures thereof.

15. In a process for producing high density polyethylene comprising the steps of:
(a) polymerizing ethylene in the presence of a vanadium catalyst and an organoaluminum co-catalyst, said vanadium catalyst obtained by;

(b) treating an inert support in an inert solvent with a vanadium compound, an organoaluminum compound, and an organophosphorus compound to produce a treated support, said vanadium compound being selected from the group of compounds represented by one of the formulas:

$$VCl_x(OR')_{3-x}$$
$$\|$$
$$O$$

wherein x is a number from 0 to 3 and R' is a hydrocarbon radical;

$$V(AcAc)_z$$
$$\|$$
$$(O)_{3-z}$$

wherein z is a number from 2 to 3 and (AcAc) is an acetyl acetonate group;

$$VCl_2(AcAc) \text{ or } VCl(AcAc)_2,$$

wherein (AcAc) is an acetyl acetonate group; and $$VCl_3 \cdot nB$$

wherein n is a number from 2 to 3 and B is a Lewis base which can form hydrocarbon-soluble complexes with $VCl_3$ to form a vanadium catalyst system; the improvement comprising: prepolymerizing the treated support of step (b) with a small amount of ethylene and an aliphatic diene, said diene being present in the range of from about 0.1 to about 100 moles of said diene per gram of vanadium, wherein said polyethylene has $C_{10}$-$C_{32}$ n-paraffin content of about 0.2 weight percent or less, and a melt index ratio of at least 75.

16. A process for producing high density polyethylene comprising the steps of:

(a) polymerizing an α-olefin monomer, and a minor amount of an aliphatic diene having at least four carbon atoms, in the presence of an organoaluminum co-catalyst and a vanadium catalyst system, said vanadium catalyst system obtained by:

(b) treating an inert support in an inert solvent with a vanadium compound, an organoaluminum compound, and an organo phosphorus compound, a halogenating agent, said vanadium compound being selected from the group of compounds represented by one of the formulas:

$$VCl_x(OR')_{3-x}$$
$$\|$$
$$O$$

where x is a number from 0 to 3 and R' is a hydrocarbon radical;

$$V(AcAc)_z$$
$$\|$$
$$(O)_{3-z}$$

where z is a number from 2 to 3 and (AcAc) is an acetyl acetonate group;

$$VCl_2(AcAc) \text{ or } VCl(AcAc)_2,$$

where (AcAc) is an acetyl acetonate group; and $$VCl_3 \cdot nB$$

where n is a number from 2 to 3 and B is a Lewis base which can form hydrocarbon-soluble complexes with $VCl_3$ to form said vanadium catalyst system, and (c) recovering polyethylene having a $C_{10}$-$C_{32}$ n-paraffin content of about 0.2 weight percent or less and a melt index ratio of at least 75.

* * * * *